Patented Nov. 2, 1948

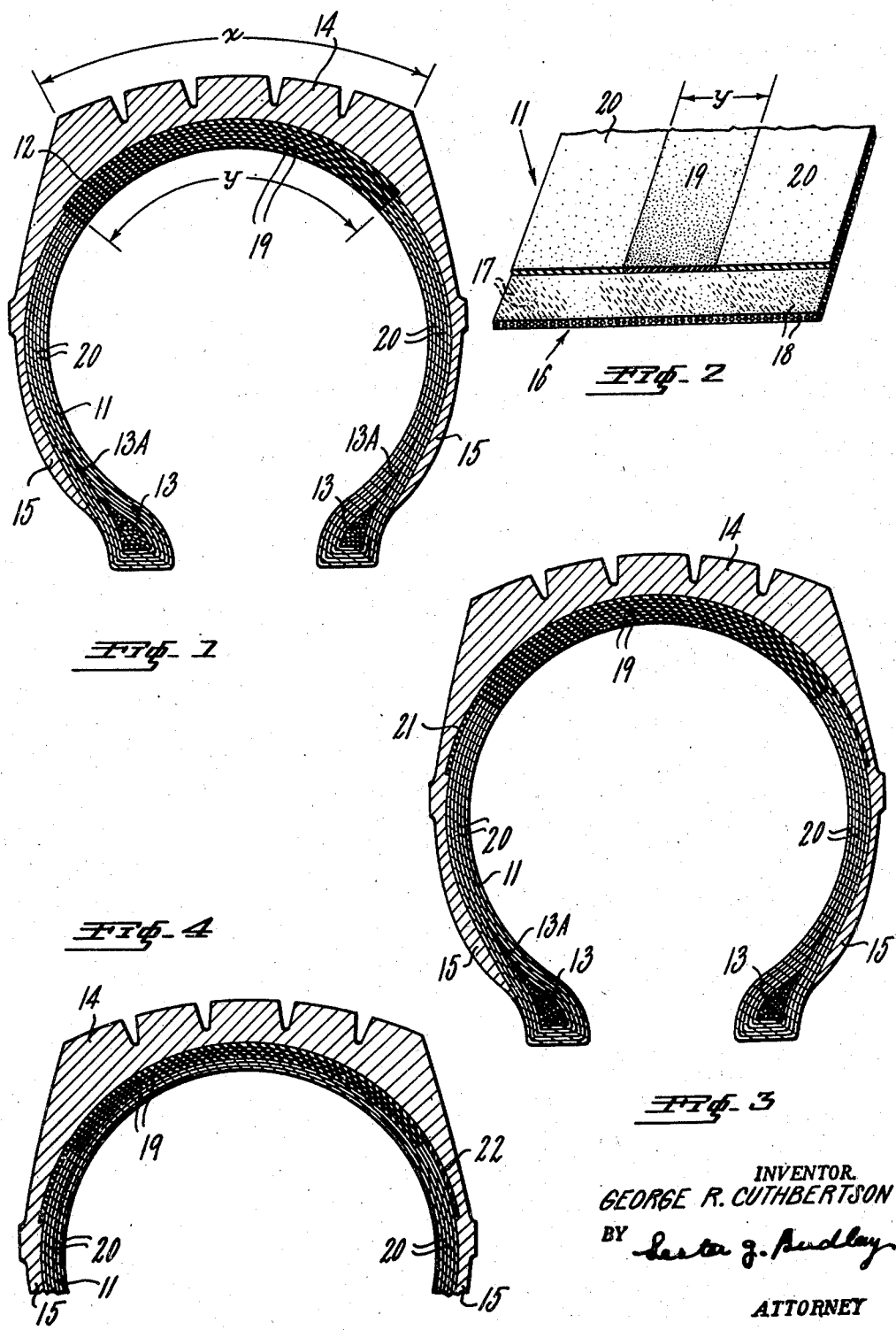

2,452,998

UNITED STATES PATENT OFFICE 2,452,998

PNEUMATIC TIRE

George R. Cuthbertson, Detroit, Mich., assignor to United States Rubber Company, New York, N. Y., a corporation of New Jersey Application August 1, 1944, Serial No. 547,543

3 Claims. (Cl. 152—354)

1

This invention relates to pneumatic tires and in particular it relates to the carcass of a pneumatic tire and to the disposition of the rubber or rubber-like materials associated with the carcass plies.

This application is a continuation in part of my prior application Serial Number 457,811, filed September 10, 1942, now abandoned.

In the construction of pneumatic tires it has been the general practice to coat all of the plies of the tire carcass with a rubber composition of the same general characteristics. As a result of this practice of using the same rubber composition throughout the width of the plies it has been necessary to choose a rubber composition which would suit the average performance expectation of the different regions of the tire. It has long been the practice to use in the tread of tires a comparatively stiff rubber compound having good resistance to tread wear, and to use in the carcass of the tire a more flexible rubber compound capable of performing very different functions. For example, that portion of the carcass which underlies the tread is subjected to severe flexing, and the fact that it lies under the tread prevents ready dissipation of heat which is generated in the carcass. The sidewall portions of the carcass receive a moderate degree of flexing and the sidewalls are relatively thin so that such heat as is here generated is readily dissipated.

An entirely different situation arises at the bead region of the carcass, for here in order to obtain good performance from a pneumatic tire it is important that the bead region of the carcass be relatively stiff. This is understandable since the tire rim is rigid and the rim engaging portions of the tire bead must likewise be relatively rigid. From this relatively rigid condition of the tire beads the tire carcass extends toward the crown region of the carcass which is highly flexible. Obviously such a transition from a rigid portion of a tire to a highly flexible portion requires different functional characteristics of the materials which make up the carcass.

It is also important that the bead region of the tire be able to resist relatively high temperatures without deterioration. This is particularly true of tires for heavy service operation. On tires such as are used on buses the repeated braking action of the vehicle causes the generation of considerable heat and the brake mechanism being located in close proximity to the tire rim results in a transmission of heat to the rim and bead portion of the tire. The composition of rubber or rubber-like materials associated with the bead region of the tire therefore should be able to resist such temperatures. These temperatures in some cases are so high that the fabric in the bead region becomes charred and disintegrates. Actually the temperature in the bead region may reach above 400° F. In many cases the conventional rubber stocks when used in the bead region of the tire will soften, by reason of the high temperature, to such an extent that the bond between plies will separate causing premature failure of the tire.

From the foregoing it will be seen that different portions of the tire carcass are subjected to widely varying conditions, and that the best degree of performance cannot be obtained by the use of an average rubber composition throughout the carcass. I have found that a substantial improvement in tire performance can be obtained by utilizing in the crown region of the tire carcass a rubber or rubber-like composition having a low modulus and a low hysteresis, and by using in the sidewall and bead portions of the tire a rubber or rubber-like composition having a high modulus. Throughout this disclosure "modulus" means "modulus of elasticity," and "hysteresis" means "mechanical hysteresis."

With reference to the crown portion of the carcass I have found that the low modulus and low hysteresis composition permits a high degree of flexibility in this area with low heat build-up. Therefore a rubber or rubber-like composition having these properties is ideally suited for use in the crown area but is not necessarily suitable for the best performance in other portions of the carcass. More specifically the rubber or rubber-like composition in the crown region of the carcass should be one having a modulus at 200% elongation of about 50 to 350 pounds. Also it should have a torsional hysteresis of .020 to 0.70. These properties of the composition are for a temperature of about 74° F. for the modulus and 285° F. for hysteresis. Since temperatures generally in the crown region of the carcass frequently rise to about 275 F. the rubber or rubber-like composition in this region should give adequate performance at these high temperatures. By the use of a stock in the crown area having a low modulus and low hysteresis within the range described, the ability of the composition to withstand flexing fatigue throughout a wide range of temperatures is attained.

In connection with the sidewall and bead region of the tire carcass the important requirements of being able to resist transmitted high temperatures while providing rigidity for structural performance is obtained by the use of high modulus rubber or rubber-like compositions. A preferred rubber or rubber-like composition suitable for use in the sidewall and bead region of the carcass should have a modulus at 200% elongation of about 350 to 1500 pounds when tested at 74° F. In some cases it is desirable also that this composition should have a torsional hysteresis of .070 to .35 at a temperature of 285° F.

It is therefore among the objects of my invention to provide a pneumatic tire in which the carcass has different rubber or rubber-like compositions distributed in different regions of the carcass; to provide a tire that is so proportioned that no one location of the tire will be weaker than the remaining structure of the tire under operating conditions; to provide a pneumatic tire carcass capable of resisting higher temperatures and maintaining high fatigue resistance; to provide a pneumatic tire carcass which permits the use of synthetic rubber while maintaining adequate tire performance; and, to provide a tire carcass which may be manufactured efficiently and which may employ economical materials.

These and other objects and advantages will appear more fully in the following detailed description when considered in connection with the accompanying drawing; in which, Fig. 1 is a transverse view, in section, of a pneumatic tire embodying the present invention;

Fig. 2 is a perspective view of a portion of a strip of coated fabric used to form the carcass plies of the present invention.

Fig. 3 is a transverse view, in section, of a pneumatic tire showing a modification of the invention; and Fig. 4 is a transverse view, in section, of a pneumatic tire showing a further modification of the invention.

Referring to the drawing and in particular to Fig. 1 I show an embodiment of my invention in the form of a pneumatic tire, the carcass of which is formed of a plurality of plies 11 constituting the strain resisting elements of the carcass. Underlying the outermost plies in the region of the tread there is provided the usual added ply 12 generally referred to as a breaker strip or shock ply. The tire is provided with the usual inextensible bead elements 12. In accordance with customary practice the tire carcass also includes flippers 13A which lie in the bead region and which wrap around the wire beads and extend between the plies 11 part way along the sidewall of the tire. The purpose of the flipper is to assist in anchoring the inextensible beads 13 with the tire carcass and to add rigidity to the bead portion in such a manner as to form a gradual blending with the carcass thus permitting a graduated reinforcement between the rigid bead structure and the flexible sidewall portion of the tire carcass.

The carcass is encased with a tread 14 forming the road engaging portion of the tire, and sidewall portions 15 which constitute a cover for the carcass extending from the tread to the bead region. The tread 14 may be formed of natural rubber composition, reclaimed rubber composition, or synthetic rubber composition each of which is compounded to possess wearing characteristics.

The plies 11 are formed of cords of cotton, rayon or nylon spaced in adjacent parallel relationship by dipping or coating of cords with a dispersion of latex or other rubber or rubber-like cement. In some cases the cords may be passed directly from a creel to a calendar where a thin layer of rubber or rubber-like composition is applied to the cords for retaining them in a parallel relationship. After the cords are so treated plies are cut therefrom in a manner so that the cords lie in a diagonal position relative to the length of the ply. As thus far described in connection with Fig. 1 the construction is conventional in all respects.

The advantages of my invention are obtained by the application of layers of particular rubber compositions to different portions of the fabric plies. These layers are generally referred to as recoat. It is to be understood, however, that these coatings may constitute the recoat or the skim coat, and that the feature of my invention is that the principal compositions which are applied to different portions of the fabric plies are to have the distinctive properties hereinafter specified.

To provide a tire carcass having a low modulus and low hysteresis composition in the crown portion and a high modulus composition in the sidewall and bead portion it is necessary to depart radically from the usual method of forming the coated plies of strain resisting elements. Instead of using one compound over the entire width of the ply as heretofore, I provide a strip of low modulus, low hysteresis composition extending centrally of the ply representing the crown region of the tire, and on either side of the crown portion strip and adjacent thereto I apply to the fabric plies, strips of high modulus rubber or rubber-like composition.

In order to obtain a clearer understanding of the ply construction reference may be had to Fig. 2 of the drawing wherein the cord fabric is designated by 16. This fabric is composed of individual cords 17 which in the ply lie in a diagonal position as indicated in the drawing. The conventional solutioning or skim coating of the fabric to an extent sufficient to retain the cords together for further processing is designated by the numeral 18 and the material here used may be the same as used upon these cords heretofore. The strip 19 represents that portion of the tire carcass in the crown or tread region, this strip is composed of a low modulus and low hysteresis rubber or rubber-like composition. The strips 20 lying on each side of the strip 19 are formed of a rubber or rubber-like composition having a high modulus. These strips 19 and 20 may be applied to both faces of the cord fabric 16 but satisfactory results are secured by applying them to only one face of the fabric. The thickness of the strips 19 and 20 shown in Fig. 2 should be about from .01 to .03 of an inch. In many cases it may be desirable that the layers 20 shall have a high hysteresis as well as a high modulus.

The width of the layer 19 extends throughout the portion of the carcass which lies beneath the tread. This is illustrated in Fig. 1 in which the arc $x$ represents the width of the tire tread 14 from shoulder to shoulder. The arc $y$ represents the area of the carcass containing the low modulus and low hysteresis composition. The angle representing the arc $y$ should be at least equal to or greater than the arc $x$.

The object in maintaining the low modulus, low hysteresis composition below the tread portion is to provide a composition in this region which is capable of resisting high temperatures while maintaining proper fatigue properties. This relationship is essential since the relatively thick tread forms in effect a heat insulation medium over that portion of the carcass which is subjected to severe flexing. The result of the tread functioning as an insulating medium is to prevent dissipation of heat from the carcass and this makes it necessary that the carcass in the tread region withstand severe flexing and relatively high temperature.

That portion of the tire carcass containing the low modulus, low hysteresis composition is indicated by 19 in Fig. 2, it is also indicated in Figs. 1, 3 and 4 of the drawing by heavy section lines. The layers 20 as shown in Fig. 2 formed of high modulus composition is indicated in Figs. 1, 3 and 4 of the drawing by light section lines.

The modification shown in Fig. 3 of the drawing differs from that shown in Fig. 1 in that the outermost or breaker ply designated by 21 and treated with the low modulus, low hysteresis composition has a greater width than the other plies 19. This is of advantage in some cases in that it provides at least a portion of the low modulus, low hysteresis composition at points beyond the shoulder portions of the tire tread 14.

A still further modification is illustrated in Fig. 4 in which the low modulus, low hysteresis composition is applied to a wide breaker ply 22 and to some but not all of the plies lying in the tread region of the carcass.

Certain natural rubber compositions and certain Neoprene compositions possessing low modulus and low hysteresis characteristics which are particularly well adapted for use to form the layers 19, are demonstrated by the following examples:

Example A

| | |
|---|---|
| Natural rubber | 100.0 |
| Zinc oxide | 80.0 |
| Softener | 4.0 |
| Antioxidant | 1.5 |
| Accelerator | 0.5 |
| Sulphur | 3.5 |

Example B

| | |
|---|---|
| Natural rubber | 100.0 |
| Semireinforcing carbon black | 25.0 |
| Softener | 3.5 |
| Zinc oxide | 5.0 |
| Accelerator | 0.4 |
| Antioxidant | 1.5 |
| Sulphur | 3.5 |

Example C

| | |
|---|---|
| Neoprene | 100 |
| Semireinforcing carbon black | 20 |
| Softener | 15 |
| Zinc oxide | 10 |
| Magnesium oxide | 4 |
| Antioxidant | 1 |
| Activator | 1 |

Each of the above compositions when cured and tested at 74° F. has a modulus at 200% elongation of 50 to 350 pounds, and at a temperature of 285° F. a torsional hysteresis of .020 to .070.

In carrying out the practice of my invention the bead and sidewall regions of the carcass are formed of high modulus compositions. Examples of such compositions are as follows:

Example D

| | |
|---|---|
| Natural rubber | 100 |
| Reinforcing carbon black | 45 |
| Zinc oxide | 10 |
| Softeners | 7 |
| Antioxidant | 2 |
| Accelerator | .75 |
| Sulphur | 3.50 |

Example E

| | |
|---|---|
| Buna-S | 100 |
| Reinforcing carbon black | 33.0 |
| Zinc oxide | 5.0 |
| Softener | 12.0 |
| Accelerator | 1.0 |
| Sulphur | 3.0 |

Each of these Examples D and E in the form of a cured composition and tested at 74° F. has a modulus at 200% elongation of 350 to 1500 pounds, and at a temperature of 285° F. a torsional hysteresis of .070 to 0.35.

In all of the examples herein, the modulus is determined in accordance with A. S. T. M. standard practice, the rate of elongation of the testing machine being in the order of 20 inches per minute. Also, the torsional hysteresis is determined in accordance with a standard procedure outlined in Rubber Chemistry and Technology, vol. 14, No. 1, January, 1941, page 34, entitled "A torsional hysteresis test for rubber," by Mooney and Gerke.

By utilizing high modulus compositions for the bead and sidewall regions of the carcass, tire performance is obtained which according to actual tests shows superior bead performance that is 80% higher than a conventional type similar size tire. The high modulus stock when associated with the carcass in the bead region and sidewall region of the tire and particularly in the regions occupied by the flipper 13A results in better rigidity at that portion of the tire which lies between the fixed beads and the flexible portions of the carcass. Also, at the bead region the use of a high modulus composition is desirable in that it is capable of resisting high temperatures without softening or deteriorating. This is of importance when it is considered that the braking mechanisms of heavy vehicles transmit temperatures in the order of 400° F. to the bead region of the carcass. Because of the stiffening properties and the heat resisting ability of the high modulus composition it is particularly well suited to extend from the fixed bead portions of the carcass to a point near the shoulder region of the tire.

While the present invention is applicable to various sizes of pneumatic tires having various numbers of plies, it is particularly applicable to tires used for heavy service purposes because in such tires the temperature problem in the tread and bead areas of the carcass is of greater importance.

It will be apparent from the foregoing that as a result of the present invention it is now practical to employ in the crown or other area of the carcass the particular stock best adapted for use there without being concerned as to how this same stock would perform in other portions of the tire carcass. It will also be apparent that by providing a rubber or rubber-like composition of low modulus and low torsional hysteresis in the crown area, and a rubber or rubber-like composition of high modulus in the sidewall and bead areas, a pronounced improvement in tire performance is secured; and while I have shown preferred embodiments of my invention it is to be understood that it is susceptible of those modifications which appear obvious and as particularly defined ian the scope of the appended claims.

Having thus described my invention, what I claim and desire to protect by Letters Patent is:

1. A pneumatic tire comprising a plurality of plies of strain resisting elements forming a carcass, substantially inextensible bead wires, a tread portion, sidewall portions, and a layer of plastic composition encasing each of said plies, the plastic material of the layers encasing at least some of the plies in the region of the crown of the tire being formed of a natural rubber composition having good resistance to flexing fatigue at temperatures of at least 275° Fahrenheit and the plastic material of the layers of the remaining side-wall portions of the carcass being formed of a synthetic rubber-like composition.

2. A pneumatic tire comprising a plurality of plies of strain resisting elements forming a carcass, bead wires having at least some of the plies anchored thereto, a tread portion and sidewall portions, a layer of plastic composition covering each of said plies, the principal plastic layers encasing the greater portion of the plies in the region of the crown of the carcass being formed of a natural rubber compound which in its optimum state of cure and at a temperature of 74° F. has a modulus at 200% elongation of 50 to 350 pounds, and the layer of plastic composition covering these same plies at the region of the bead and sidewall portions of the carcass being formed of a synthetic rubber-like composition having under similar conditions a higher modulus.

3. A pneumatic tire comprising a plurality of plies of strain resisting elements forming a carcass, bead wires having at least some of the plies anchored thereto, a tread portion and sidewall portions, a layer of plastic composition covering each of said plies, the principal plastic layers encasing the greater portion of the plies in the region of the crown of the carcass being formed of a natural rubber compound which in its optimum state of cure and at a temperature of 74° F has a modulus at 200% elongation of 50 to 350 pounds and at a temperature of 285° F. a torsional hysteresis in the range of .02 to .07, and the layer of plastic composition covering these same plies at the region of the side walls being formed of a synthetic rubber-like composition having at said temperature a much higher torsional hysteresis.

GEORGE R. CUTHBERTSON.

REFERENCES CITED

The following references are of record in the file of this patent:

UNITED STATES PATENTS

| Number | Name | Date |
| --- | --- | --- |
| 1,579,817 | Keith | Apr. 6, 1926 |
| 1,913,330 | Brickman | June 6, 1933 |
| 2,098,037 | Hazell | Nov. 2, 1937 |